US008725318B1

(12) United States Patent
McCusker

(10) Patent No.: US 8,725,318 B1
(45) Date of Patent: May 13, 2014

(54) SYSTEMS AND METHODS FOR INCORPORATING VIRTUAL NETWORK COMPUTING INTO A COCKPIT DISPLAY SYSTEM AND CONTROLLING A REMOTE AIRCRAFT SYSTEM WITH THE VNC-INCORPORATED CDS

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 153 days.

(21) Appl. No.: 13/235,614

(22) Filed: Sep. 19, 2011

Related U.S. Application Data

(60) Provisional application No. 61/488,171, filed on May 20, 2011.

(51) Int. Cl.
*G06F 17/00* (2006.01)
*G06F 9/455* (2006.01)

(52) U.S. Cl.
USPC .................................................. 701/3; 703/13

(58) Field of Classification Search
None
See application file for complete search history.

(56) References Cited

U.S. PATENT DOCUMENTS

2007/0070066 A1* 3/2007 Bakhash ...................... 345/419
2009/0167774 A1* 7/2009 Want et al. ................... 345/543
2010/0106870 A1* 4/2010 Saugnac ........................ 710/63
2010/0162127 A1* 6/2010 Uchino ......................... 715/740
2012/0244876 A1* 9/2012 Park et al. .................. 455/456.1

OTHER PUBLICATIONS

"Cockpit Display System Interfaces to User Systems", May 10, 2010, ARINC Specification 661-4, Aeronautical Radio, Inc., Annapolis, Maryland.

* cited by examiner

*Primary Examiner* — Behrang Badii
*Assistant Examiner* — Demetra Smith-Stewart
(74) *Attorney, Agent, or Firm* — Donna P. Suchy; Daniel M. Barbieri

(57) ABSTRACT

Novel and non-trivial systems and methods for incorporating virtual network computing ("VNC") into a cockpit display system ("CDS") and controlling an aircraft system with a VNC-incorporated CDS are disclosed. A system for incorporating VNC into the CDS is comprised of a VNC server of an aircraft system, at least one first user application ("UA"), a second UA, a pilot input device, and a CDS comprised of, in part, a processing module ("PM") configured with a corresponding method that employs both an aviation-industry standard protocol (e.g., ARINC 661) and a VNC protocol. A system for controlling an aircraft system with a VNC-incorporated CDS is comprised with a VNC server of an aircraft system, a UA, a pilot input device, a display surface format, and a CDS comprised of, in part, a PM configured with a corresponding method that employs both an aviation-industry standard protocol and a VNC protocol.

24 Claims, 11 Drawing Sheets

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 20 | 670 | 320 | 70 | 12 | 810 | 415 | 60 | 50 | 23 | 920 | 415 | 60 | 50 |
| 2 | 340 | 670 | 320 | 70 | 13 | 65 | 275 | 60 | 50 | 24 | 990 | 415 | 60 | 50 |
| 3 | 660 | 670 | 320 | 70 | 14 | 175 | 290 | 500 | 40 | 25 | 1060 | 415 | 60 | 50 |
| 4 | 980 | 670 | 320 | 70 | 15 | 665 | 275 | 60 | 50 | 26 | 1130 | 415 | 60 | 50 |
| 5 | 90 | 545 | 140 | 50 | 16 | 750 | 275 | 60 | 50 | 27 | 910 | 255 | 90 | 50 |
| 6 | 390 | 545 | 140 | 50 | 17 | 810 | 275 | 60 | 50 | 28 | 1010 | 255 | 90 | 50 |
| 7 | 690 | 545 | 140 | 50 | 18 | 65 | 135 | 60 | 50 | 29 | 1110 | 255 | 90 | 50 |
| 8 | 65 | 415 | 60 | 50 | 19 | 175 | 150 | 500 | 40 | 30 | 940 | 55 | 130 | 50 |
| 9 | 175 | 430 | 500 | 40 | 20 | 665 | 135 | 60 | 50 | 31 | 1080 | 55 | 130 | 50 |
| 10 | 665 | 415 | 60 | 50 | 21 | 750 | 135 | 60 | 50 | | | | | |
| 11 | 750 | 415 | 60 | 50 | 22 | 810 | 135 | 60 | 50 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 80 | 835 | 320 | 70 | 12 | 870 | 580 | 60 | 50 | 23 | 980 | 580 | 60 | 50 |
| 2 | 400 | 835 | 320 | 70 | 13 | 125 | 440 | 60 | 50 | 24 | 1050 | 580 | 60 | 50 |
| 3 | 720 | 835 | 320 | 70 | 14 | 235 | 455 | 500 | 40 | 25 | 1120 | 580 | 60 | 50 |
| 4 | 1040 | 835 | 320 | 70 | 15 | 725 | 440 | 60 | 50 | 26 | 1190 | 580 | 60 | 50 |
| 5 | 150 | 710 | 140 | 50 | 16 | 810 | 440 | 60 | 50 | 27 | 970 | 420 | 90 | 50 |
| 6 | 450 | 710 | 140 | 50 | 17 | 870 | 440 | 60 | 50 | 28 | 1070 | 420 | 90 | 50 |
| 7 | 750 | 710 | 140 | 50 | 18 | 125 | 300 | 60 | 50 | 29 | 1170 | 420 | 90 | 50 |
| 8 | 125 | 580 | 60 | 50 | 19 | 235 | 315 | 500 | 40 | 30 | 1000 | 220 | 130 | 50 |
| 9 | 235 | 595 | 500 | 40 | 20 | 725 | 300 | 60 | 50 | 31 | 1140 | 220 | 130 | 50 |
| 10 | 725 | 580 | 60 | 50 | 21 | 810 | 300 | 60 | 50 | | | | | |
| 11 | 810 | 580 | 60 | 50 | 22 | 870 | 300 | 60 | 50 | | | | | |

| Pos | X(o) | Y(o) | X(size) | Y(size) | Pos | X(o) | Y(o) | X(size) | Y(size) | Pos | X(o) | Y(o) | X(size) | Y(size) |
|---|---|---|---|---|---|---|---|---|---|---|---|---|---|---|
| 1 | 40 | 418 | 160 | 35 | 12 | 435 | 293 | 30 | 25 | 23 | 490 | 291 | 30 | 25 |
| 2 | 200 | 418 | 160 | 35 | 13 | 63 | 221 | 30 | 25 | 24 | 525 | 291 | 30 | 25 |
| 3 | 360 | 418 | 160 | 35 | 14 | 118 | 228 | 250 | 20 | 25 | 560 | 291 | 30 | 25 |
| 4 | 520 | 418 | 160 | 35 | 15 | 363 | 221 | 30 | 25 | 26 | 595 | 291 | 30 | 25 |
| 5 | 75 | 356 | 70 | 25 | 16 | 405 | 221 | 30 | 25 | 27 | 485 | 211 | 45 | 25 |
| 6 | 225 | 356 | 70 | 25 | 17 | 435 | 221 | 30 | 25 | 28 | 535 | 211 | 45 | 25 |
| 7 | 375 | 356 | 70 | 25 | 18 | 63 | 151 | 30 | 25 | 29 | 585 | 211 | 45 | 25 |
| 8 | 63 | 208 | 30 | 25 | 19 | 118 | 158 | 250 | 20 | 30 | 500 | 111 | 65 | 25 |
| 9 | 118 | 291 | 250 | 20 | 20 | 363 | 151 | 30 | 25 | 31 | 570 | 111 | 65 | 25 |
| 10 | 363 | 293 | 30 | 25 | 21 | 405 | 151 | 30 | 25 | | | | | |
| 11 | 405 | 293 | 30 | 25 | 22 | 435 | 151 | 30 | 25 | | | | | | ic
SYSTEMS AND METHODS FOR INCORPORATING VIRTUAL NETWORK COMPUTING INTO A COCKPIT DISPLAY SYSTEM AND CONTROLLING A REMOTE AIRCRAFT SYSTEM WITH THE VNC-INCORPORATED CDS

CROSS-REFERENCE TO RELATED APPLICATIONS

This application claims priority to U.S. Provisional Application No. 61/488,171 filed on May 20, 2011 and entitled "System and Method for Virtual Network Computing in an Avionics Environment" which is incorporated by reference.

BACKGROUND OF THE INVENTION

1. Field of the Invention

This invention pertains generally to the field of aircraft display units that provide information to the pilot or flight crew of an aircraft.

2. Description of the Related Art

Hardware and software design standards for the aviation industry have been published by the Radio Technical Commission for Aeronautics ("RTCA"). The RTCA has published DO-254 entitled "Design Assurance Guidance for Airborne Electronic Hardware" and DO-178B entitled "Software Considerations in Airborne Systems and Equipment Certification." Each publication distinguishes between simple and complex electronic hardware, recognizes five classes of failure conditions, and provides guidance for each hardware and/or software design assurance level ("DAL") associated with a given failure condition.

Level A is considered the highest DAL and corresponds to a "catastrophic" failure condition of which failure of the hardware and/or software may cause a loss of the aircraft. Level B corresponds to a "hazardous" failure condition of which failure may cause a large negative impact on safety or performance, reduces the ability of the crew to operate the aircraft due to physical distress or a higher workload, or causes serious or fatal injuries among the passengers. Level C corresponds to a "major" failure condition of which failure may be significant but have a lesser impact than a hazardous failure or significantly increases crew workload. Level D corresponds to a "minor" failure condition of which failure may be noticeable but have a lesser impact than a major failure. Level E corresponds to a "no effect" failure condition of which failure has no impact on safety, aircraft operation, or crew workload.

To meet the higher DALs, many standards have been developed. With respect to presenting the pilot with flight-related information and aircraft-system information and/or allowing the pilot to control systems installed somewhere on the aircraft by interacting with a cockpit display unit, data exchange protocols have been published by Aeronautical Radio, Incorporated ("ARINC") in ARINC Specification 661 entitled "Cockpit Display System Interfaces to User Systems" ("ARINC 661"), an aviation industry standard known to those skilled in the art.

Although ARINC 661 could be employed for all aircraft systems, ARINC 661 may be considered too demanding for a manufacturer of an aircraft system because of the strict protocols stated therein. For example, information about real time parameter(s) of an aircraft system may be presented to the pilot and/or facilitate pilot control of the system; in order to do so, however, the strict protocols of the ARINC 661 have to be followed.

There may be occasions when an aircraft system does not need to meet higher DALs. For example, a cabin control system could be employed in an aircraft, but failure of such system may have no impact on safety, aircraft operation, and/or crew workload; instead, failure may mean a loss of passenger comfort. In this instance, although it may be beneficial to provide information about and/or control of the cabin control system to the pilot in the cockpit, it may not be beneficial and/or cost-effective for the manufacturer of the cabin control system to employ the strict protocols of ARINC 661 when such system does not have to meet higher DALs.

BRIEF SUMMARY OF THE INVENTION

The embodiments disclosed herein present novel and non-trivial system and method for incorporating virtual network computing ("VNC") into a cockpit display system ("CDS"). Moreover, a present novel and non-trivial system and method for controlling a remote aircraft system from the cockpit with the VNC-incorporated is disclosed.

In one embodiment, a system is disclosed for incorporating VNC into a CDS. The system is comprised with a VNC server of an aircraft system, at least one first user application ("UA"), a second UA, a pilot input device, and a cockpit display system comprised of a processing module ("PM"). As embodied herein, a pixel data set is established by the PM, where the pixel data set is representative of a first image comprised of one or more non-VNC widgets based upon widget data provided by one or more first UAs. Then, input data corresponding to a request to display a second image is received by the PM from a pilot input device. In response, data representative of the request is generated in a first protocol (e.g., ARINC 661 protocol) by the PM and sent to the second UA. In response to the request data, data representative of a request for remote frame buffer ("RFB") data of the second image is generated in a second protocol (e.g., VNC protocol) by a VNC client of the second UA and sent to the VNC server. In response to the request for RFB data, data representative of the RFB is generated in the second protocol by the VNC client and sent to the VNC server of the second UA. In response to the RFB data, VNC image widget data is generated from the RFB data and sent to the PM by the second UA. Then, the VNC image widget data is incorporated into the pixel data set.

In another embodiment, a method for incorporating VNC into a CDS is disclosed. When configured with this method, the PM may perform the actions discussed in the preceding paragraph.

In another embodiment, a system is disclosed for controlling a remote aircraft system from the cockpit with the VNC incorporated. The system is comprised with a VNC server of an aircraft system, a UA, a pilot input device, a predefined display surface format comprised of one or more layers to which one or more non-VNC widgets are assigned and one or more layers to which one or more VNC widgets are assigned, and a cockpit display system comprised of a PM. As embodied herein, a pixel data set representative of a first image comprised of at least one VNC image widget is established by the PM. Then, input data corresponding to an event of the VNC image and location is received by the PM from a pilot input device. In response, data representative of the location and a widget event state is generated in a first protocol by the PM and sent to the UA. Then, data representative of a notice and request for RFB data of the second image is generated in a second protocol by a VNC client of the UA and sent to the VNC server. In response to the request for RFB data, data representative of the RFB is generated in the second protocol by the VNC client and sent to the VNC server of the UA. In response to the RFB data, VNC image widget data is generated from the RFB data and sent to the PM by the UA. Then, the VNC image widget data is incorporated into the pixel data set. As embodied herein, the system disclosed in this paragraph may be included with the system disclosed above for incorporating VNC into a CDS.

In another embodiment, a method for controlling a remote aircraft system from the cockpit with the VNC-incorporated is disclosed. When configured with this method, the PM may perform the actions discussed in the preceding paragraph.

BRIEF DESCRIPTION OF THE DRAWINGS

FIG. 5C depicts a change to the local image of FIG. 5A in response to the change to the remote image of FIG. 5B.

FIG. 6A depicts the exemplary remote image of FIG. 3A simultaneously with the exemplary local image of FIG. 2A when applied to the exemplary display surface format of FIG. 2D.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
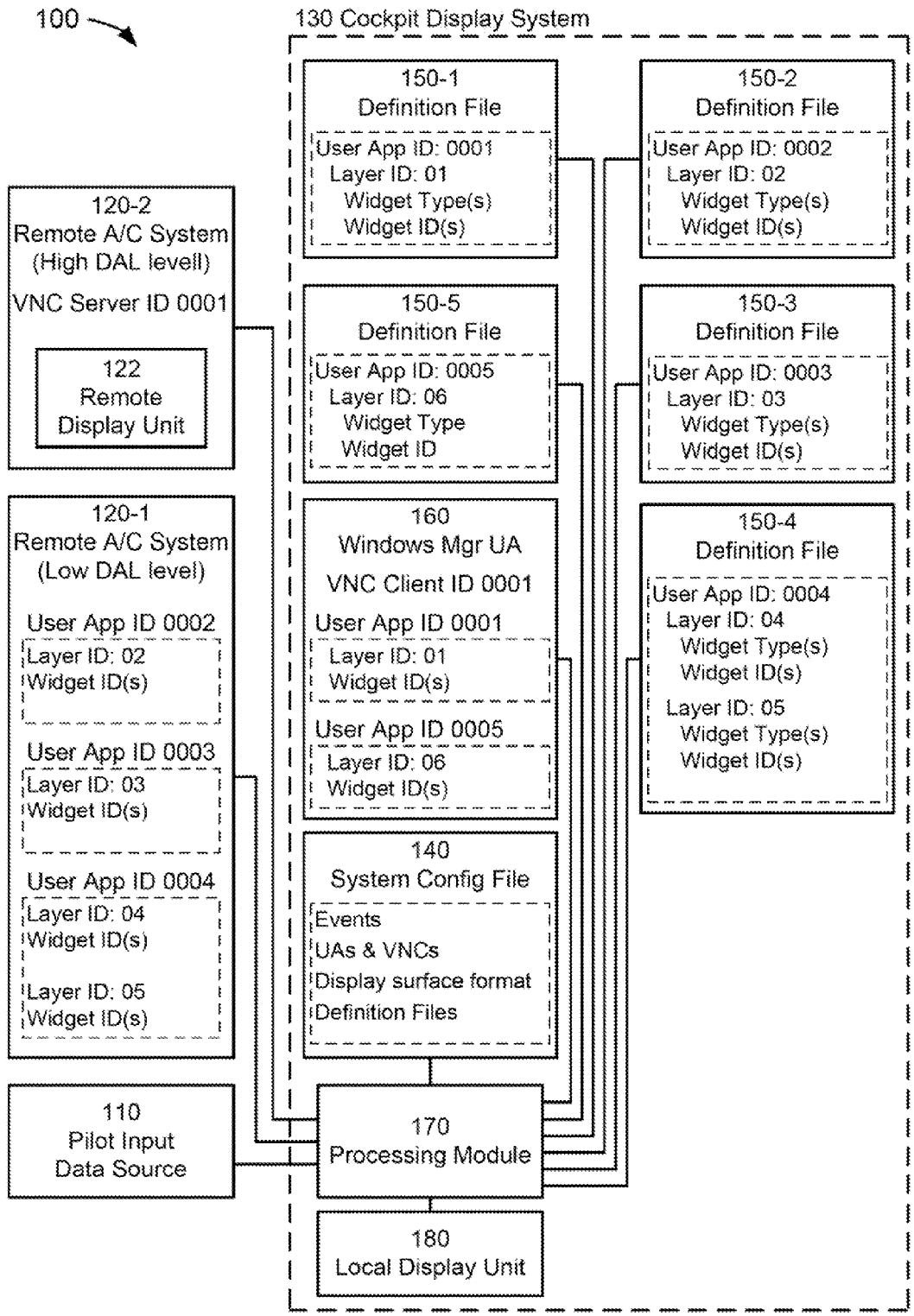
FIG. 1 depicts a block diagram of a windows management and presentation system.

FIG. 1 depicts a block diagram of a windows management and presentation system (collectively, "presentation system") 100 suitable for implementation of the techniques described herein, wherein information generated by system employing hardware and/or software certified to a relatively low design assurance level ("DAL") may be presented on the same display surface of at least one display unit of a system employing hardware and/or software certified to a higher DAL. The presentation system 100 of an embodiment of FIG. 1 includes a pilot input device 110, at least one remote aircraft system 120, and a cockpit display system ("CDS") 130.

In an embodiment of FIG. 1, the pilot input device 110 could comprise any source for facilitating a pilot's interaction with graphical user interfaces ("GUI") referred to as interactive widgets that are displayed on the surface of a local display unit 180 (some non-interactive widgets could also be displayed). The pilot input device 110 may include any device that allows for the manual selection of a widgets and/or entry of data. Such devices could include, but are not limited to, a tactile device (e.g., keyboard, control display unit, cursor control device, touch screen device, etc. . . . ) and/or speech recognition systems. A local display unit 180 could be included as a pilot input device 110 if it is able to receive pilot input (e.g., touch screen display). As embodied herein, the pilot input device 110 may provide input representative of a pilot's selection to a processing module ("PM") 170. It should be noted that, although the discussion herein is drawn to the term "pilot," the definition of such term should not be limited to flight personnel but should include ground personnel and/or any viewer of the local display unit 180.

In an embodiment of FIG. 1, remote aircraft systems 120 could be comprised of any system installed in an aircraft in which a user application ("UA") and/or a virtual network computing ("VNC") server is installed. Types of remote aircraft systems 120 may include, but are not limited to, air conditioning, auto flight, communications, electrical power, cockpit/cabin systems, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems. As embodied herein, the contents of each UA and/or the VNC server may be read by the PM 170 when the CDS 130 is initialized.

As embodied herein, the UA of remote aircraft systems 120 and those items discussed below such as a system configuration file ("CF") 140, a plurality of definition files (DFs, or singularly "DF") 150, a windows manager UA ("WMUA") 160, and/or the PM 170 may be software components stored in a digital memory storage device or PM-readable media (i.e., media readable by the PM 170) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Although the system CF 140, the DFs 150, and the WMUA 160 are illustrated as being internal to the CDS 130, the storage devices storing any one of these may be external to the CDS 130 and used as an internal component of any other system of the aircraft.

Remote aircraft system 120-1 could represent of one or more remote aircraft systems owning one or more UAs and layers therein, where each layer may be considered as the highest level entity known by each UA. Remote aircraft system 120-2 could represent of one or more remote aircraft systems owning one or more VNC servers. Referring to FIG. 1, remote aircraft system 120-1 owns UA 0002 through UA0004 and layers 02 through 05, and remote aircraft system 120-2 owns a VNC server 0001; the CDS 130 owns WMUA 160, layers 01 and 06, and VNC client 0001. For the purpose of discussion herein, remote aircraft system 120-1 will be assumed to be certified to a relatively high DAL, and remote aircraft system 120-1 will be assumed to be certified to a lower DAL; DALs are discussed in detail below.

The UAs of remote aircraft system 120-1 may facilitate the dynamic exchange of blocks of data between the CDS 130 and remote aircraft systems 120-1, where exchange protocols have been published by Aeronautical Radio, Incorporated ("ARINC") in ARINC Specification 661 entitled "Cockpit Display System Interfaces to User Systems" ("ARINC 661"), an aviation industry standard known to those skilled in the art which is hereby and herein incorporated by reference in its entirety. In one direction of the dynamic exchange, UAs 0002 through 0004 of remote aircraft system 120-1 may send real-time parameters measured and/or calculated by remote aircraft system 120-1 to the CDS 130 as updated runtime parameters of one or more widgets of layers 0002 through 0004; also, UAs 0002 through 0004 may request changes to one or more layer properties of layers 0002 through 0004 such as, but not limited to, changes to layer visibility.

In the other direction of the dynamic exchange, the CDS 130 may send notices of real-time events (e.g., events initiated by interactions between a pilot input device 110 and widgets) to UAs 0002 through 0004 of remote aircraft system 120-1 as well as send notices of layer property changes such as, but not limited to, changes to layer activation. As embodied herein, remote aircraft system 120-1 may send widget parameters and layer property requests to the PM 170 and may receive widget events and layer properties from the PM 170.

Remote aircraft system 120-2 could be comprised of any system installed in an aircraft in which a VNC server is installed; a remote display unit 122 could be included in the remote aircraft system 120-2. The VNC server is part of a broader VNC system which, in addition to the VNC server, may be comprised of a VNC client and a VNC protocol employed in the exchange of data between the VNC server and the VNC client. The VNC server may be an application that, when employed, permits the remote image of the remote display unit 122 to be viewed on another display unit, e.g., the local display unit 180, by sharing the contents of a frame buffer of the remote display unit 122, i.e., the remote frame buffer ("RFB"). The VNC client may be an application which allows the remote image to be viewed and/or controlled remotely. For the purpose of illustration and not limitation, personnel located in the cockpit of an aircraft may interact with a "VNC image widget" presented on the surface of the local display unit 180 to control a cabin system from the cockpit just as personnel located in the cabin interact with the remote image presented on the surface of the remote display unit 122 to control the cabin system.

Referring to FIG. 1, the VNC protocol may be a protocol which facilitates the exchange of data between the CDS 130 and the remote aircraft system 120-2; one non-exclusive example of a VNC protocol is an RFB protocol. The VNC client 0001 may send client-to-server messages of real-time event occurrences to VNC server 0001 such as, but not limited to, requests for updated RFB data and location and state data of a real-time event. In response, the VNC server 0001 may send server-to-client messages to the VNS client 0001 such as, but not limited to, updated RFB data. As embodied herein, the remote aircraft system 120-2 may send server-to-client messages to the PM 170 and receive client-to-server messages from the PM 170.

In an embodiment of FIG. 1, the CDS 130 may be comprised many components including the system CF 140, the plurality of DFs 150, the WMUA 160, the PM 170, and/or the local display unit 180. The system CF 140 may be used to configure the initial settings for the CDS 130. The system CF 140 may be comprised of instructions for establishing a communication link(s) with one or more pilot input devices 110 for the subsequent receiving of input from a pilot's selection through widget interaction, where such input may trigger the PM 170 to recognize event associated with the pilot's selection. Also, the system CF 140 may include instructions or information related to the UAs of remote aircraft system 120-1, the VNC server of remote aircraft system 120-2, the UAs and the VNC client stored in the WMUA 160, the layers owned by both remote aircraft system 120-1 and the CDS 130, the configuration of a display surface format associated with the location of window(s) and the assignment of layer(s) to each window, and the loading and interpreting of the plurality of DFs 150. As embodied herein, the contents of the system CF 140 providing the initial settings for the CDS 130 may be loaded and interpreted by the PM 170 to begin an initialization process of the CDS 130.

In an embodiment of FIG. 1, DFs 150 could describe a hierarchical structure of widgets assigned to layers, where the widget could be considered as a building block. Because the types and/or identification of widgets between layers could vastly differ, no specific widget type and/or identification are shown in FIG. 1 (including those shown in the remote aircraft system 120-1). Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement parameters. Also, each widget could have a graphical look that represents how the object will appear when it is drawn on the display surface of the local display unit 180. As stated above, an interactive widget could be a GUI which provides a means for the pilot to interact with the CDS 130.

A widget could be grouped into one or more categories such as, but not limited to, the following: a container or logical widget (e.g., basic container, mutually exclusive container, radio box, etc. . . . ), a graphical representation widget (e.g., edit box text, graphical primitive ("GP") line, GP rectangle, label, push button, toggle button, etc. . . . ), a text string widget (edit box text, label, push button, toggle button, etc. . . . ), an interactive widget (e.g., edit box text, push button, toggle button, etc. . . . ), a map management widget (e.g., map grid, horizontal map, horizontal map source, horizontal map item list, etc. . . . ), a dynamic motion widget (e.g., GP line, GP rectangle, label, etc. . . . ), a utility widget (e.g., connector, cursor reference, etc. . . . ), and a UA validation widget (e.g., basic container, edit box text, horizontal map, horizontal map source, mutually exclusive container, push button, radio box, toggle button, etc. . . . ).

As embodied herein, a VNC image widget could be comprised of an image created from the RFB data request and received by the VNC client 0001. For widget type, DF 150-5 could specify a memory size and/or location for storing RFB image data when received by the VNC client 0001 and forward to the WMUA 160. As discussed below, a manufacturer and/or end-user may configure the VNC image widget. The VNC image widget could be the same size as the remote image and/or a scaling factor could be applied. Also, part of the RFB data (e.g. parts of the top, bottom, and/or sides) could be truncated. The VNC widget could also be comprised of widget parameters such as, visibility and enablement as stated in ARINC 661. The VNC image widget may not be interactive. That is, it may be an image only because the RFB data represents image data when the exchange between the VNC server 0001 and the VNC client 0001 takes place; however, when visible and enabled, the pilot may nevertheless treat the VNC image widget as being interactive when he or she selects the VNC image widget. As embodied herein, the location of the pilot's selection may be captured as surface (i.e., screen) coordinates by the VNC client 0001 and translated into corresponding remote image coordinates that are sent to the VNC server 0001.

Each DF 150 could be comprised of a single layer or a grouping of layers, where each layer could be comprised of a single widget or a grouping of widgets. Referring to FIG. 1, DFs 150-1, 150-2, 150-3, and 150-5 are comprised of single layers 01, 02, 03, and 06, respectively. DF 150-4 is comprised of a grouping of layers 04 and 05. As discussed above, each DF 150 and each layer included therein could be owned by one UA. Referring to FIG. 1, DFs 150-1 and 150-5 are owned by WMUA 160, and DFs 150-2 through 150-4 are owned by UAs 0002 through 0004, respectively. As embodied herein, the contents of the DFs 150 may be read by the PM 170 when the CDS 130 is initialized.

In an embodiment of FIG. 1, the WMUA 160 is representative of one or more UAs and/or one or more VNC clients that could be owned by the CDS 130. Similar to the UAs of each remote aircraft system 120, the PM 170 may send notices of real-time event occurrences to the WMUA 160 and layer property changes such as layer activation to layer 01 and/or layer 06. Responding to such notices, the WMUA 160 may update the runtime parameters of one or more widgets owned by layer(s) and send them to the PM 170 as well as requests for changes to one or more layer properties such as the layer visibility and activity of layer 01 and/or layer 06. It should be noted that, although the VNC client 0001 is shown in FIG. 1 as being included but segregated in the WMUA 160, the VNC client 0001 may be treated separately from UAs 0001 and 0005 because the VNC client 0001 may employ VNC protocol whereas UAs 0001 and 0005 may employ ARINC 661 protocol. As embodied herein, the contents of the WMUA 160 may be read by the PM 170 when the CDS 130 is initialized.

In an embodiment of FIG. 1, the PM 170 may be any electronic data processing unit or combination of electronic data units which execute software or source code stored, permanently or temporarily, in a digital memory storage device as discussed above. The PM 170 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the PM 170 could be a processor(s) used by or in conjunction with any other system of the aircraft.

The PM 170 may be programmed or configured to receive data from the pilot input device 110, from the UAs 0002 through 0004 of remote aircraft system 120-1, from the VNC server 0001 of remote aircraft system 120-2, from the system CF 140, from the DFs 150, and/or from the WMUA 160. The PM 170 may be programmed to send data to the UAs 0002 through 0004 of remote aircraft system 120-1, to the VNC server 0001 of remote aircraft system 120-2, to the WMUA 160, and/or to the local display unit 180. The PM 170 may be programmed to execute the methods embodied herein and discussed in detail below.

As embodied herein, the terms "programmed" and "configured" are synonymous with respect to the execution of software or source code developed for the specific functions and methods embodied herein. The PM 170 may be electronically coupled to systems and/or sources to facilitate the receipt of data; as embodied herein, operatively coupled may be considered as interchangeable with electronically coupled. It is not necessary that a direct connection be made; instead, such receipt of input data and the providing of output data could be provided through a data bus or through a wireless network.

In an embodiment of FIG. 1, the local display unit 180 comprises any unit having a display surface on which widgets may be presented to the pilot. The local display unit 180 could be, but is not limited to, a PFD, ND, Head-Up Display, Head-Down Display, Multi-Purpose Control Display Unit; EICAS, Electronic Centralized Aircraft Monitor, Multi-Function Display, Side Displays, and Data Link Control Display Unit. As embodied herein, the local display unit 180 may receive image data sent by the PM 170.

The PM 170 may be programmed to own and manage one or more windows displayed on the surface of a display unit, where each window may be defined as a physical demarcation of space on the surface of the local display unit 180. Such physical demarcation information may have been provided in the system CF 140 and read by the PM 170. The visibility of each window could be managed by the PM 170, wherein the appearance of widgets in each window may be based upon both layer properties and widget parameters.

The drawings of FIG. 2 illustrate the local display unit 180 and three exemplary display surface formats that may be used to depict one local image on the surface of the local display unit 180, where the physical demarcation of space has created one or more windows comprised of one or more layers. The drawings of FIG. 2 are provided for the purpose of illustration and not of limitation.

Figure 2A:
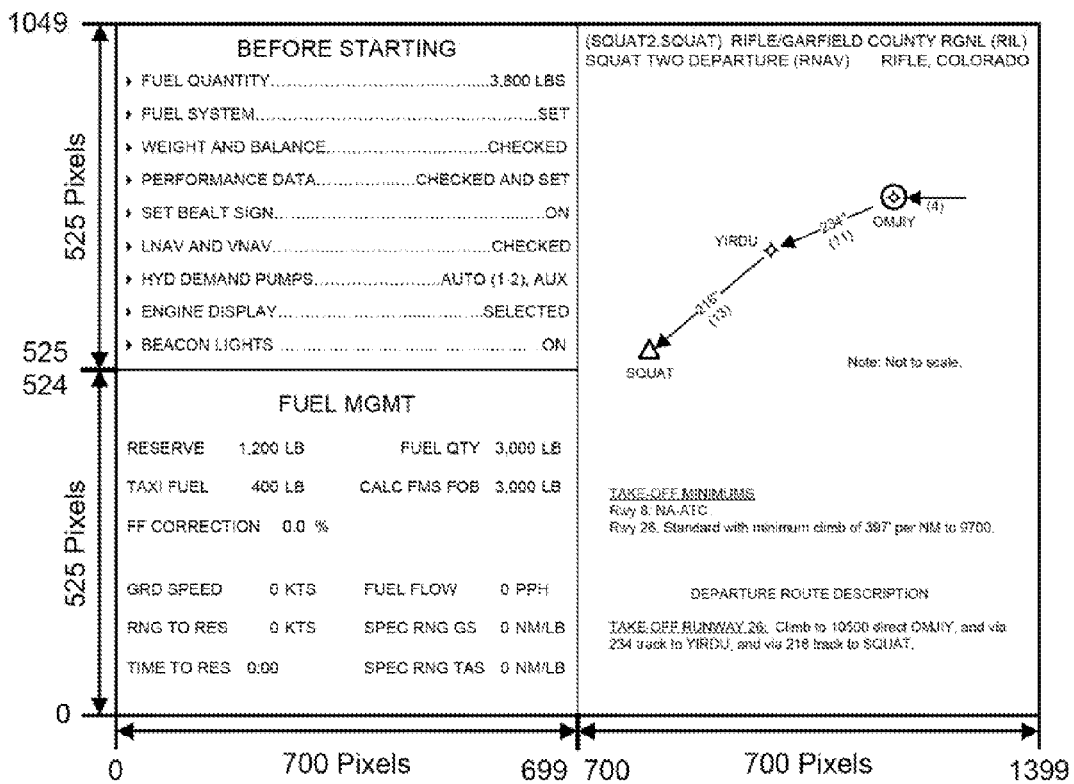
FIG. 2A depicts a local display unit and an exemplary local image presented thereon.

Referring to FIG. 2A, the local display unit 180 has a surface area of 1400 by 1050 pixels. On the surface of the display unit, a "BEFORE STARTING" checklist comprised of at least non-VNC widget is depicted on the upper left half, a "FUEL MGMT" panel comprised of at least non-VNC widget is depicted on the lower left half, and a departure procedure comprised of at least non-VNC widget and identified as "SQUAT TWO DEPARTURE" is depicted on the right half. It should be noted that, although the discussion herein will be drawn to the use of pixels as a unit of measurement, the use of another unit(s) such as millimeters may be used in place of pixels or along with pixels, where the latter may require the use of a conversion factor.

Figure 2B:
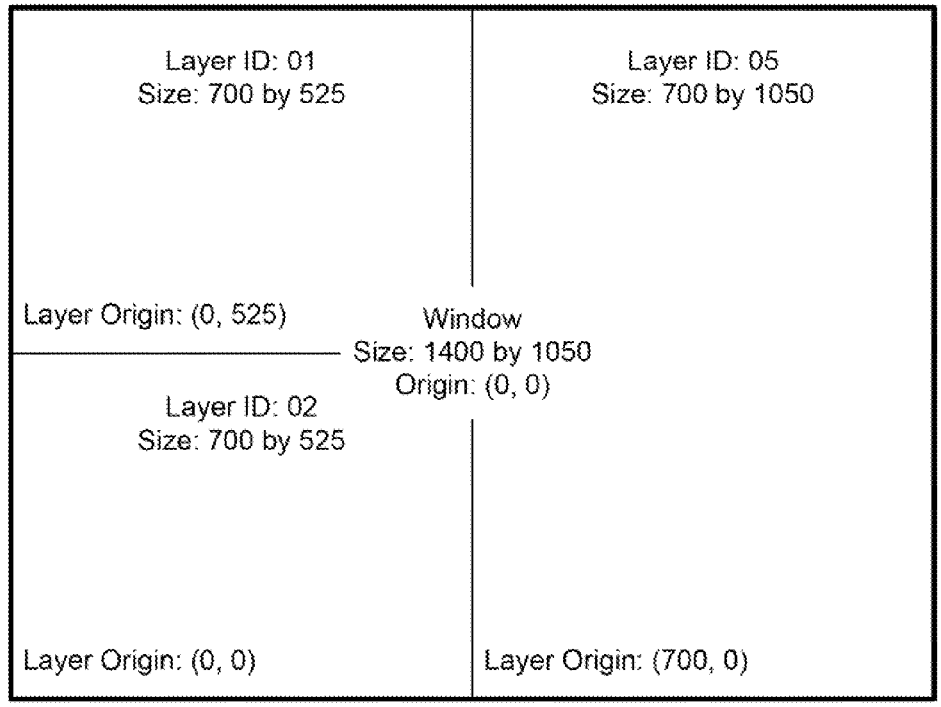
FIG. 2B illustrates a first exemplary display surface format for displaying a local image.

Referring to FIG. 2B, the exemplary display surface format shown is comprised of a single window (depicted with thick borders). In this example, it is assumed that the single window originates from surface pixel location (0, 0) and has the size of 1400 by 1050 pixels. The window is comprised of layers 01, 02, and 05 (depicted with thin borders). Layer 01 originates at window pixel location (0, 525) and has the size of 700 by 525 pixels, layer 02 originates from window pixel location (0, 0) and has the size of 700 by 525 pixels, and layer 05 originates from window pixel location (700, 0) and has the size of 700 by 1050 pixels; herein, window pixel locations are made in reference to the origin of the window. As shown in FIG. 1, layers 01, 02, and 05 are owned by UAs 0001, 0002, and 0004, respectively; UA 0001 is owned by the CDS 130; and UAs 0002 and 0004 are owned by remote aircraft system 120-1. For the purpose of discussion, the sizes of layers 01, 02, and 05 remain the same for the display surface formats of FIGS. 2C and 2D, and layers 03 and 04 and UA 0003 have been intentionally omitted (layer 06 is discussed below).

Figure 2C:
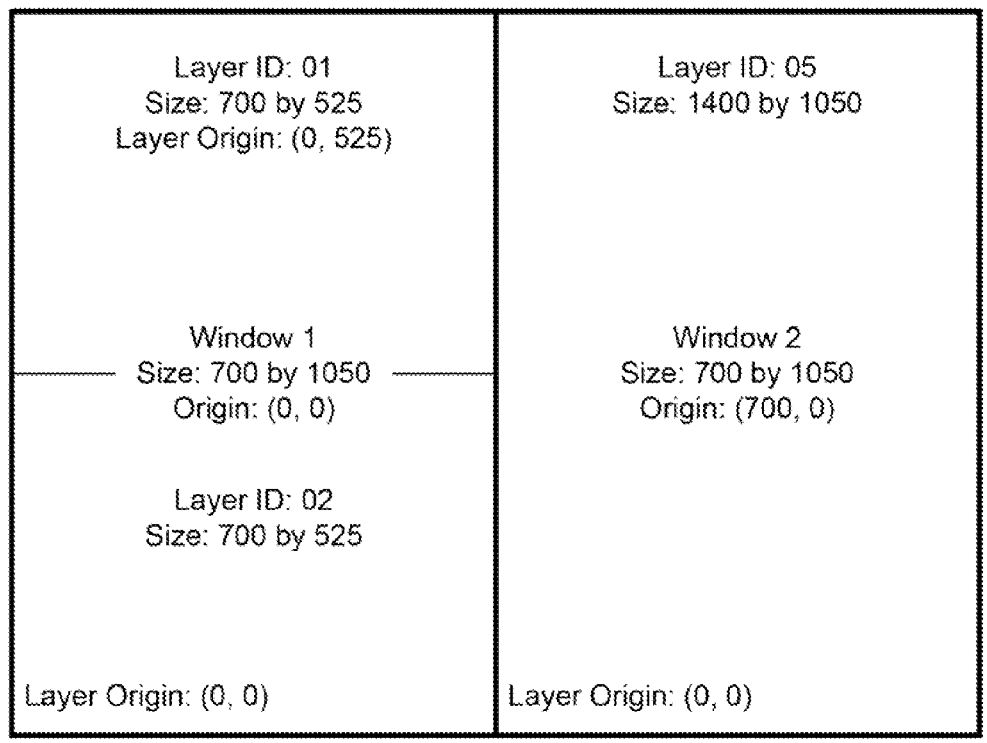
FIG. 2C illustrates a second exemplary display surface format for displaying a local image.

Referring to FIG. 2C, the exemplary display surface format shown is comprised of two windows. In this example, it is assumed that window 1 originates from surface pixel location (0, 0) and has the size of 700 by 1050 pixels, and window 2 originates from surface pixel location (700, 0) and has the size of 700 by 1050 pixels. Window 1 is comprised of layers 01 and 02, where layer 01 originates at pixel location (0, 525) of window 1, and layer 02 originates from pixel location (0, 0) of window 1. Window 2 is comprised of layer 05, where layer 05 originates at pixel location (0, 0) of window 2.

Figure 2D:
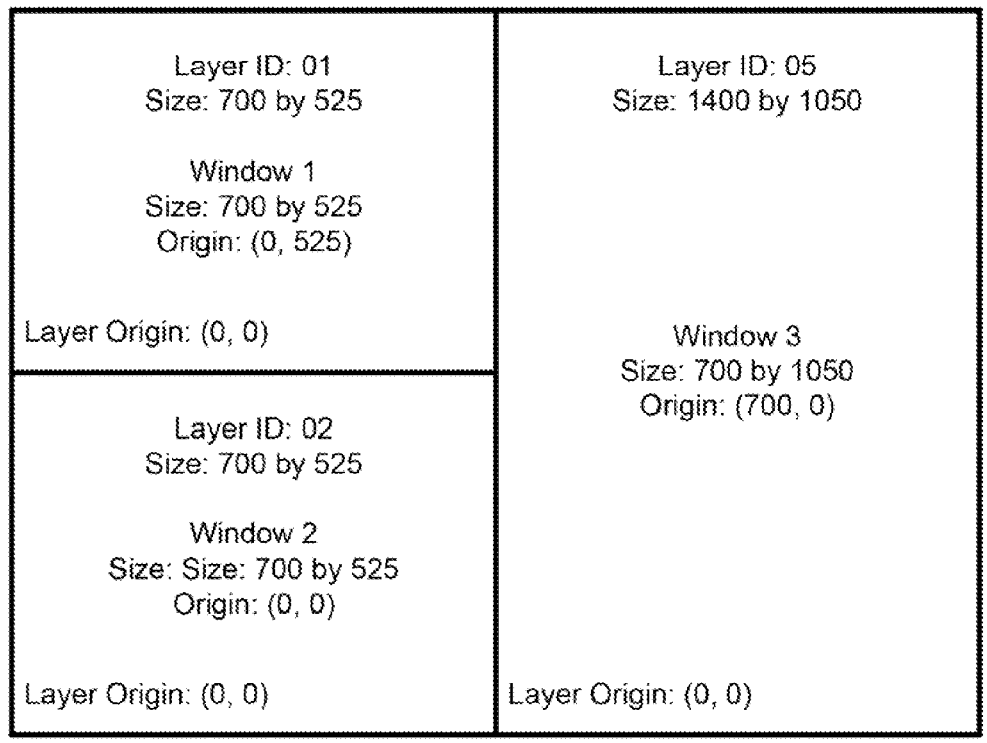
FIG. 2D illustrates a third exemplary display surface format for displaying a local image.

Referring to FIG. 2D, the exemplary display surface format shown is comprised of three windows. In this example, it is assumed that window 1 originates from surface pixel location (0, 525) and has the size of 700 by 525 pixels, window 2 originates from surface pixel location (0, 0) and has the size of 700 by 525 pixels, and window 3 originates from surface pixel location (700, 0) and has the size of 700 by 1050 pixels. Window 1 is comprised of layer 01, window 2 is comprised of layer 02, and window 3 is comprised of layer 05, where each layer originates at pixel location (0, 0) of its respective window.

To arrive at the local image shown in FIG. 2A, the PM 170 could have established a pixel data set representative of the image by employing ARINC 661 protocols. For instance, the layer activation property for layers 01, 02, and 05 has been set to the "on" position. After the PM 170 has sent notices of the activation to UA 0001 of the WMUA 160 and UAs 0002 and 0004 of remote aircraft system 120-1, the PM 170 has received requests from each of them to set the visibility property of these layers to the "on" position.

Figure 3A:
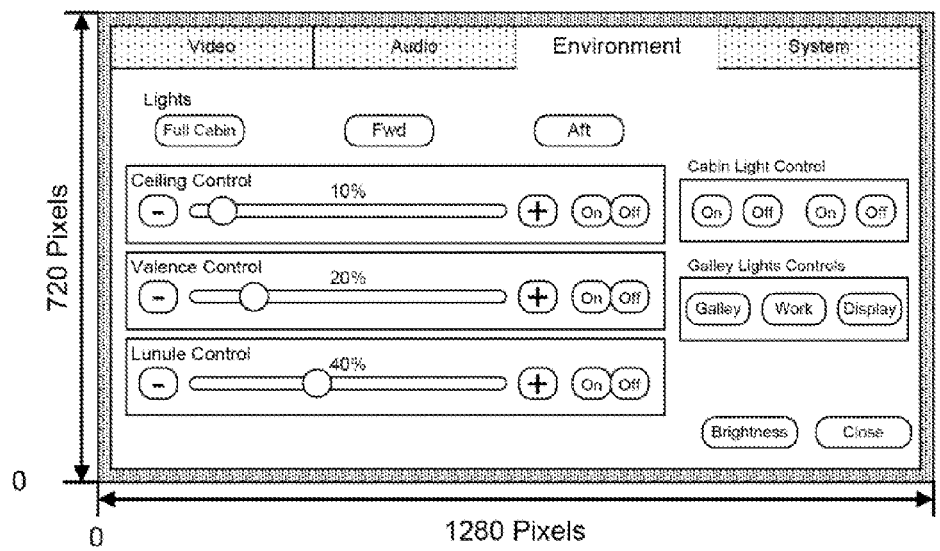
FIG. 3A depicts a remote display unit and an exemplary remote image presented thereon.

The drawings of FIG. 3 illustrate the remote image depicted on the surface of the remote display unit 122 and one exemplary display surface format that may be used to depict such remote image. For the purpose of illustration and not limitation, FIG. 3A illustrates the remote display unit 122 as a touch screen device having a surface area of 1280 by 720 pixels that depicts a plurality of interactive widgets comprised of index tabs, pushbutton switches, and sliders. As shown in this illustration, the interactive widgets may facilitate the interaction between cabin personnel and a cabin control system used for providing comfort to passengers riding in the cabin during a flight. For the purpose of illustration, the cabin control system will be discussed, and although the following discussion will be drawn to the image of FIG. 3A, the embodiments disclosed herein are not limited to merely a cabin control system.

Figure 3B:
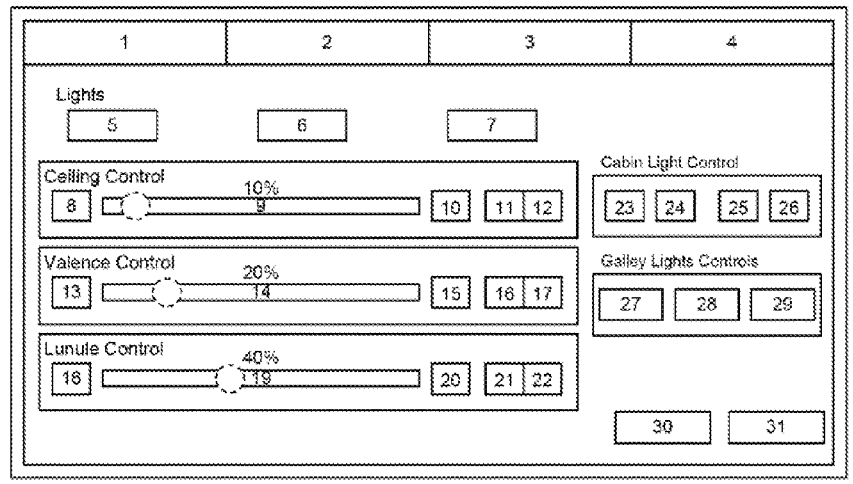
FIG. 3B illustrates an exemplary display surface format for displaying a remote image.

Referring to FIG. 3B, the exemplary display surface format shown is comprised of a single window originating from surface pixel location (0, 0) occupying the entire display surface area of 1280 by 720 pixels. The window is comprised of a single layer originating at window pixel location (0, 0) and has the size of 1280 by 720 pixels. The layer is comprised of 31 interactive widgets corresponding to the index tabs (positions 1-4), push button switches (positions 5-8, 10-13, 15-18, and 20-31), and sliders (positions 9, 14, and 19). The location of the origin of each interactive widget is shown in the map table of FIG. 3B as X(ref) and Y(ref), where X(ref) and Y(ref) indicate the number of pixels measured from the origin of the layer to the origin of the widget; similarly, the size of each widget is shown in the map table as X(size) and Y(size), where X(size) and Y(size) are the number of pixels measured from the origin of the widget. As embodied herein, remote aircraft system 120-2 owns the window, layer, and widgets.

The advantages and benefits of the embodiments discussed herein may be illustrated by showing methods in which VNC techniques may be employed by two aircraft systems, where a non-ARINC 661 aircraft system (e.g., remote aircraft system 120-2) comprised of relatively simple hardware and/or software may be incorporated by an ARINC 661 aircraft system (e.g., the CDS 130) comprised of complex hardware and/or software. Hardware and software design standards have been published by the Radio Technical Commission for Aeronautics ("RTCA"). The RTCA has published DO-254 entitled "Design Assurance Guidance for Airborne Electronic Hardware" and DO-178B entitled "Software Considerations in Airborne Systems and Equipment Certification." Each publication distinguishes between simple and complex electronic hardware, recognizes five classes of failure conditions, and provides guidance for each hardware and/or software DAL associated with a given failure condition.

Level A is considered the highest DAL and corresponds to a "catastrophic" failure condition of which failure of the hardware and/or software may cause a crash. Level B corresponds to a "hazardous" failure condition of which failure may cause a large negative impact on safety or performance, reduces the ability of the crew to operate the aircraft due to physical distress or a higher workload, or causes serious or fatal injuries among the passengers. Level C corresponds to a "major" failure condition of which failure may be significant but have a lesser impact than a hazardous failure or significantly increases crew workload. Level D corresponds to a "minor" failure condition of which failure may be noticeable but have a lesser impact than a major failure. Level E corresponds to a "no effect" failure condition of which failure has no impact on safety, aircraft operation, or crew workload.

The drawings of FIGS. 4 through 7 illustrate methods in which one protocol (e.g., the VNC protocol) may be adopted and employed simultaneously with another protocol (e.g. the ARINC 661 protocol) to incorporate information generated by a system certified to a low DAL (or no DAL) with information generated by a system certified to a high DAL.

Figure 4A:
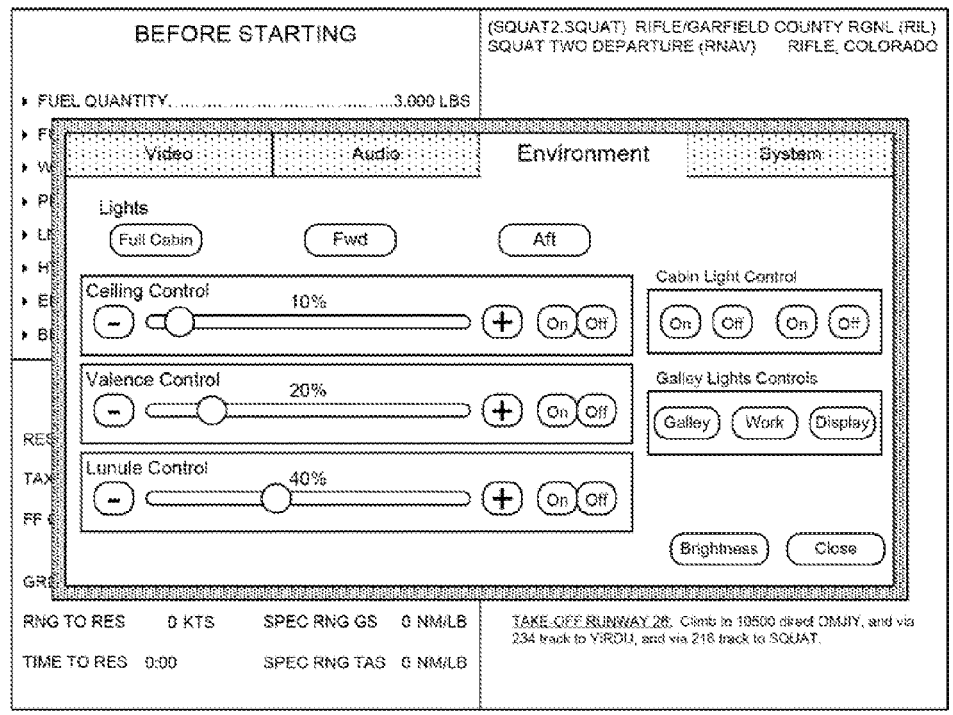
FIG. 4A depicts the exemplary remote image of FIG. 3A simultaneously with the exemplary local image of FIG. 2A when applied to the exemplary display surface format of FIG. 2B.

The drawings of FIG. 4 illustrate the local display unit 180 and the exemplary display surface format of FIG. 2B that may be used for the simultaneous depiction of images facilitated by the use of the ARINC 661 interface protocol between the CDS 130 and the remote aircraft system 120-1 simultaneously with the use of the VNC interface protocol between the CDS 130 and remote aircraft system 120-2. Referring to FIG. 4A, the remote image of FIG. 3A is shown simultaneously with the local image of FIG. 2A when applied to the display surface format of FIG. 2B; moreover, the remote image may or may not be depicted simultaneously on the remote display unit 122. In the examples presented in the drawings of FIGS. 4 and 5, personnel in the cockpit have access to and view the same image as personnel in the cabin.

To arrive at the local image shown in FIG. 4A, a pilot may have accessed a menu using the pilot input device 110, where the ability to display a menu upon a pilot's request is known to those skilled in the art. From the menu, the pilot could have made a request to enable him or her to make change(s) to the cabin settings via the cabin control system without leaving the cockpit. When the request is made, data representative of the pilot input could be received by the PM 170, where the input data may correspond to a request to display the remote image. In response, the PM 170 could activate layer 06 as well as generate and send data representative of a request to display the remote image to the WMUA 160. As embodied herein, the data could be sent using ARINC 661 protocol, and the request could be comprised of a notice to the WMUA 160 that layer 06 has been activated. In response, the WMUA 160 could forward data representative of the request to the VNC client 0001 which, in turn, could generate and send data representative of a client-to-server message in VNC protocol to the VNC server 0001 requesting RFB data.

In response, the VNC server 0001 could generate and send data representative of a server-to-client message in VNC protocol to the VNC client 0001 providing RFB data. In response, the VNC client 0001 could forward the RFB data to the WMUA 160. In response, the WMUA 160 could turn "on" at least a visibility parameter of the VNC image widget as well as generate and send VNC image widget data corresponding to the RFB data to the PM 170. As embodied herein, the VNC image widget data could be sent using ARINC 661 protocol and include in it a request to turn "on" the visibility property of layer 06. In addition, the WMUA 160 could apply a scaling factor if a scaling factor of one is not applied and/or truncate the RFB data if the WMUA 160 is configured as such. In response, the PM 170 could incorporate the VNC image widget data into the existing pixel data set being used, such that a VNC image widget indicative of the remote image shown in FIG. 4A is represented in the incorporated pixel data set.

Figure 4B:
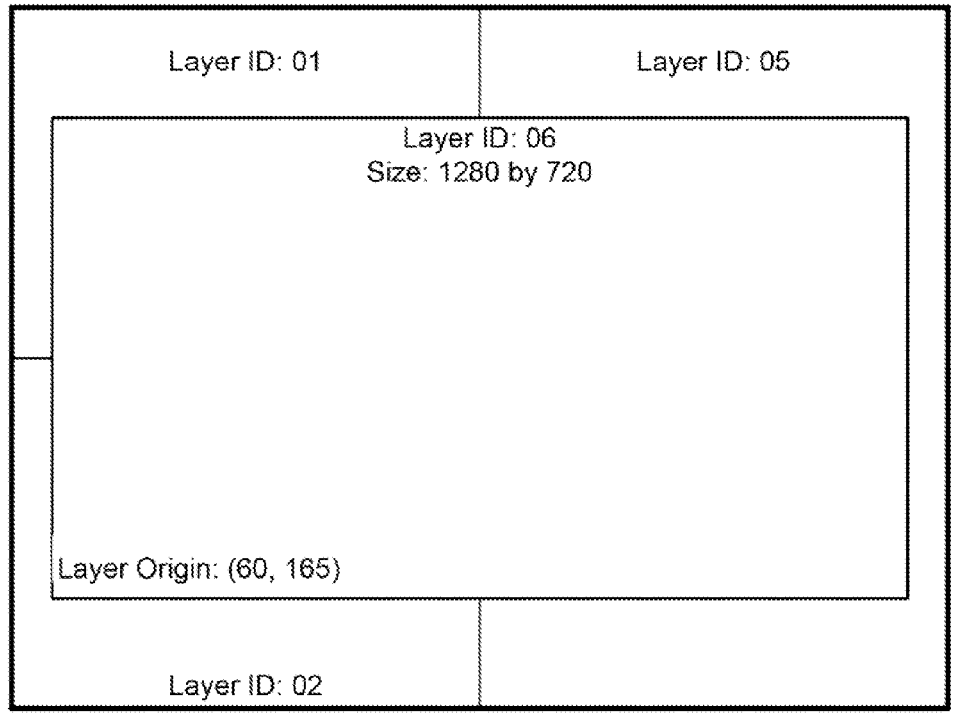
FIG. 4B depicts the exemplary display surface format of FIG. 2B with assigned layers.

Referring to FIG. 4B, the exemplary display surface format of FIG. 2B overlays layer 06 with layers 01, 02, and 05. Layer 06 originates at window pixel location (60, 165) which means it is centered on the window; the size of layer 06 is 1280 by 720 pixels, which means a scaling factor of one has been applied. Since the window for this display surface format has the same size as the surface of the local display unit 180 and the layer is centered on the window, layer 06 is also centered on the surface of the local display unit 180.

Figures 4C, 4D:
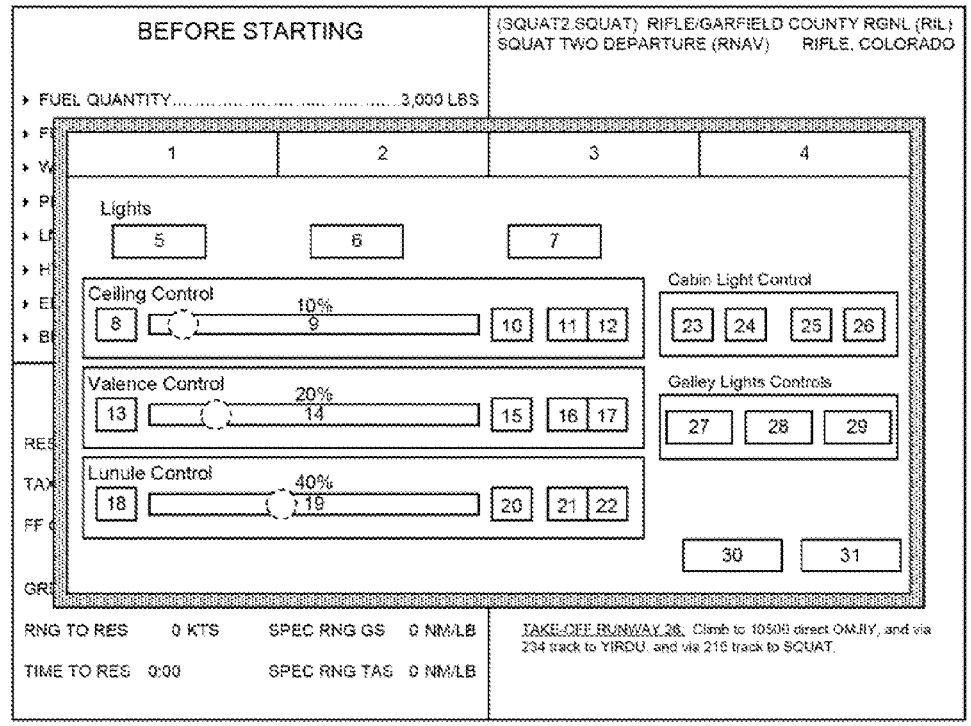
FIG. 4C depicts a map of the interactive widgets of the exemplary display surface format of FIG. 3B against the local image of FIG. 2A.
FIG. 4D depicts a map table corresponding to the map of the interactive widgets of FIG. 4C.

Referring to FIG. 4C, the map of the 31 interactive widgets shown in FIG. 3B is shown in place of its respective image shown of FIG. 4A. Because the image occupies the area of layer 06 and because layer 06 originates at window pixel location (60, 165), the origin of each of the widgets is different than listed in the map table of FIG. 3B. Referring to the map table of FIG. 4D, the locations of X(ref) and Y(ref) for each widget are increased by 60 and 165 pixels, respectively; however, the size of each widget indicated by its X(size) and Y(size) remains the same because the scaling factor of one has been applied.

It should be noted that the each of the 31 widgets have lost their interactive character as a result of the VNC protocol. The VNC server 0001 may send data representative of server-to-client message to the VNS client via the PM 170. The server-to-client message may be comprised of VNC RFB information. The data sent by the VNS server may inform the VNS client about the number of rectangles included in the data as well as the location and size of each rectangle data. Then, the location of each rectangle could be translated into location information corresponding to layer 06 and the size of each rectangle could be scaled into size information corresponding to layer 06. Then, image data representative of the translated location information and scaled size information could be generated and sent to the display unit, where the image represented in the image data could be presented in the area of layer 06.

Figure 5A:
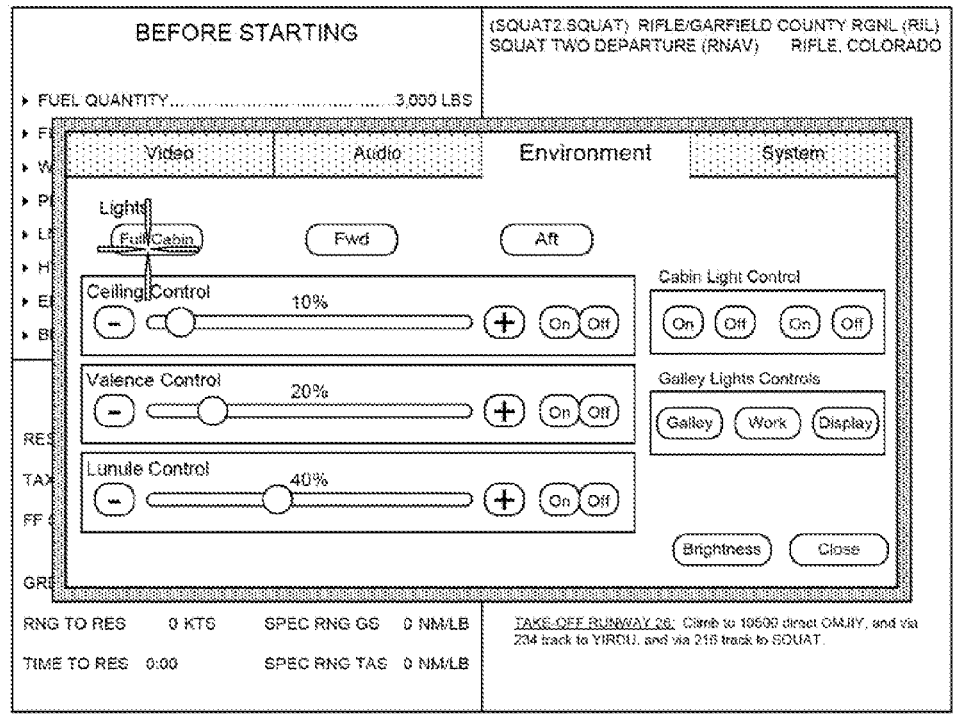
FIG. 5A depicts the local image of FIG. 4A to which a cursor has been added.

In the examples discussed in the drawings of FIGS. 5 through 7, it will be assumed that personnel in the cockpit want to turn on the lights to the full cabin and move the lunule control to 80%. As shown in FIG. 5A, a cursor has been added to image of FIG. 4A, where the cursor is located over the "Full Cabin" push button of the VNC image widget. Moreover, the VNC image widget has been manually selected by the pilot pressing and releasing the cursor's button.

When the cursor's button is pressed, the PM 170 may be programmed to capture the surface coordinates of the cursor's location (206, 720) and convert them into layer coordinates (146, 555), where the X(layer)=206−60 and Y(layer)=720−165. Because an interaction with a VNC image widget has occurred, the PM 170 may notify the WMUA 160 of the event and provide the current state of the cursor's button (e.g., the cursor's button has been pressed) and the layer coordinates of the cursor's event in the notification. In response, the WMUA 160 could forward data representative of the notification to the VNC client 0001 which, in turn, could generate and send two client-to-server messages in VNC protocol to the VNC server 0001 of the remote aircraft system 120-2.

Figure 5B:
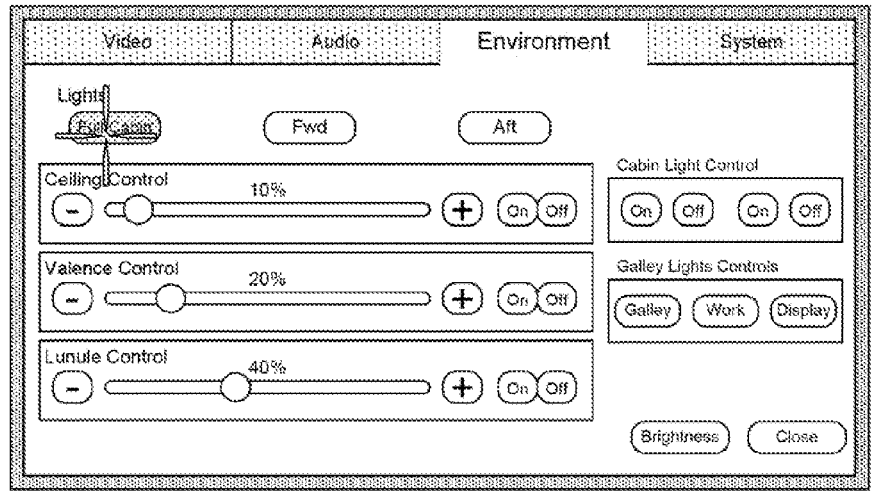
FIG. 5B depicts a change to a remote image in response to a selection.

In the first message, the VNC client 0001 may generate and send data representative of a client-to-server message to the VNC server 001 notifying it of the current state of the cursor's button (i.e., pressed) and the event location of the cursor. As this message is received by the VNC server 0001, the remote aircraft system 120-2 may respond as if personnel had pressed the surface at given location (146, 555) of the remote display unit 122; that is, the remote aircraft system 120-2 may respond as if personnel had manually selected the "Full Cabin" interactive widget on the remote display unit 122. This response is indicated in FIG. 5B by the change of appearance of "Full Cabin" interactive widget (as well as the lights in the full cabin being turned on). If the remote image's cursor is present, it could have been located on top of the interactive widget.

In the second message, the VNC client 0001 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 3B, layer coordinates (146, 555) fall within the area of position 5 which corresponds to a "Full Cabin" push-button switch. After referring to the table, the request for a limited area of the RFB may correspond to X(ref)=90, Y(ref)=555, X(size)=140, and Y(size)=50. It should be noted that, until updated RFB information has been sent to the CDS 130, there will be no change in the appearance of the VNC image widget depicted on the local display unit 180 as shown in FIG. 5A.

Figures 5C, 6A:
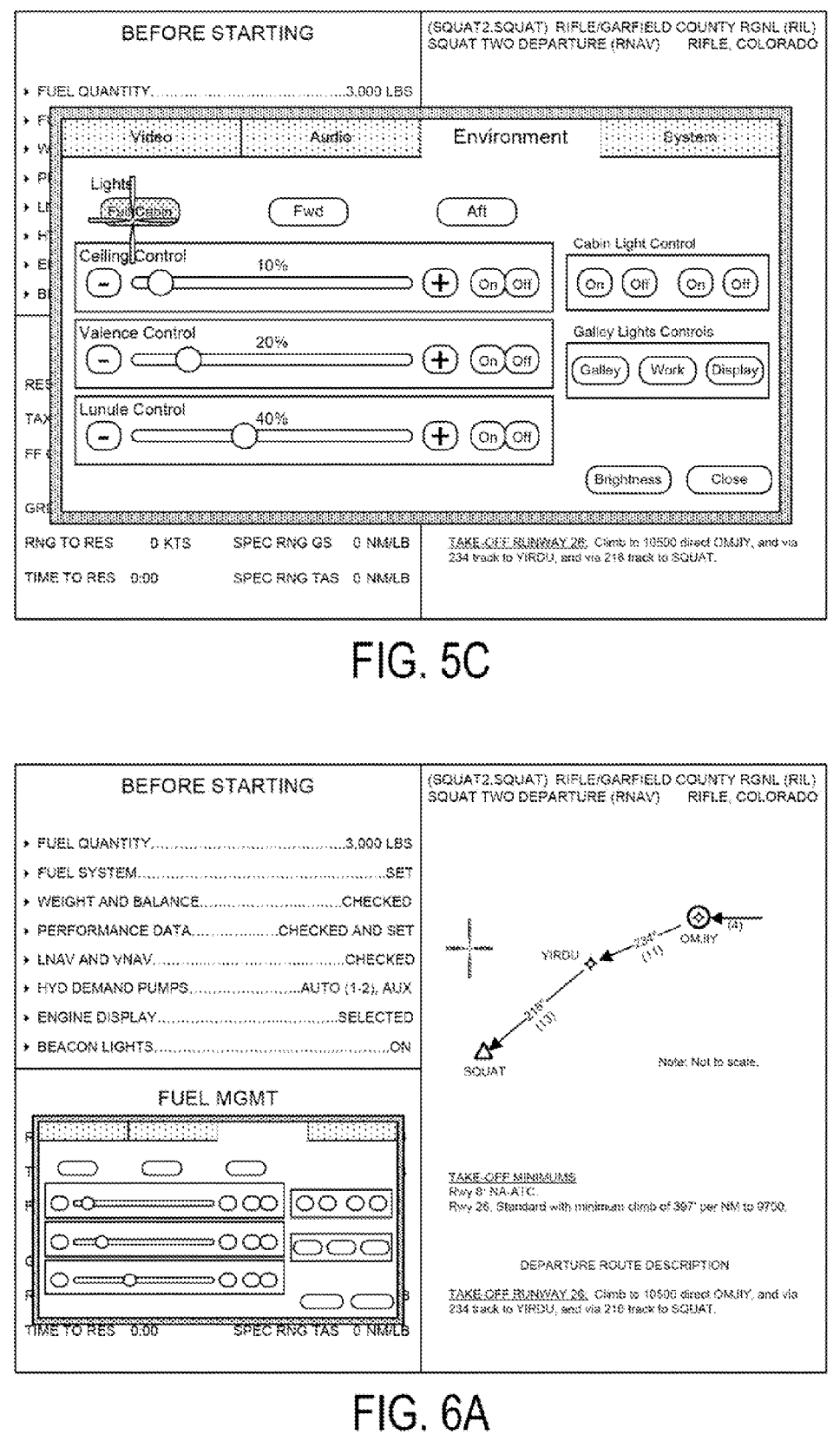

In response to receiving the second message, the VNC server 0001 may generate and send data representative of a server-to-client message in VNC protocol to the VNC client 0001 providing it with the updated RFB data of either the entire RFB or the limited-area RFB. In response, the VNC client 0001 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 5C is represented in the newly-incorporated pixel data set.

In an embodiment in which the cursor's button is pressed but not released (such as in a manual input of "clicking and dragging"), the PM 170 may be programmed to capture the surface coordinates of the cursor's location and convert them into layer coordinates repeatedly while the button is pressed. For the purpose of illustration, it will be assumed that the position of the Lunule Control slider shown in FIG. 5A will be changed by personnel in the cockpit by "clicking and dragging" the round button of the slider until the slider is located at the 80% position. Because an interaction with a widget is occurring continuously, the PM 170 may repeatedly notify the WMUA 160 of the continuous VNC image widget event by providing the current (unchanged) state of the cursor's button and the (changing) layer coordinates of the cursor's location in each notification. In response to the repeated notifications, the WMUA 160 could forward data representative of the notification repeatedly to the VNC client 0001 which, in turn, could generate and send two client-to-server messages in VNC protocol repeatedly to the VNC server 0001 of the remote aircraft system 120-2 2.

In the repeated first messages, the VNC client 0001 may generate and send repeatedly data representative of client-to-server messages to the VNC server 001 notifying it of the current (unchanging) state of the cursor's button and the current (changing) location of the cursor. As each of the repeated first messages are received by the VNC server, the remote aircraft system 120-2 may respond as if personnel had placed his or her finger on top of the round button of the interactive Lunule Control slider of the remote display unit 122 (assuming a touch screen in this example) and moved his or her finger to the right, "dragging" the slider to the right until his or her finger is lifted from the screen presumably as the position of the slider reaches the 80% position (and the lunule lights reach 80%).

In the repeated second messages, the VNC client 0001 may repeatedly generate and send data representative of client-to-server messages to the VNC server 0001 requesting it for updated RFB information of either the entire RFB or a limited-area RFB in the same fashion as discussed above. In response to receiving each repeated second message, the VNC server 0001 may generate and send data representative of a server-to-client message to the VNC client 0001 providing it with the updated RFB data of either the entire RFB or the limited-area RFB. In response, the VNC client 0001 could forward the updated RFB data to the WMUA 160 repeatedly. In response, the WMUA 160 could generate and send updated VNC image widget data corresponding to the RFB data to the PM 170 repeatedly. In response, the PM 170 could incorporate the updated VNC image widget data into the existing pixel data set repeatedly. As a result, a VNC image widget will be displayed on the surface of the local display unit 180 in which the Lunule Control slider will appear to move to the right until the cursor's button is released when the 80% position has been reached.

It should be noted that, although the remote aircraft system 120-2 responded to pressing of the cursor's button, a manufacturer and/or end-user could have configured the remote aircraft system 120-2 to respond when the cursor's button has been released and not when it's been pressed. In such configuration, the current state of the cursor's button in the first message generated by the WMUA 160 could have corresponded to the releasing of the cursor's button instead of the pressing of the cursor's button. Alternatively, an additional message corresponding to the releasing of the cursor's button could have been generated by the WMUA 160 in sequence after the first message but before the second message.

The drawings of FIG. 6 illustrate the local display unit 180 and the exemplary display surface format of FIG. 2D that may be used for the simultaneous depiction of images facilitated by the use of the ARINC 661 interface protocol between the CDS 130 and the remote aircraft system 120-1 simultaneously with the use of the VNC interface protocol between the CDS 130 and remote aircraft system 120-2. Referring to FIG. 6A, the remote image of FIG. 3A is shown simultaneously with the local image of FIG. 2A when applied to the display surface format of FIG. 2D; as stated above, the remote image may or may not be depicted simultaneously on the remote display unit 122. In the example presented in the drawings of FIGS. 6 and 7, personnel in the cockpit have access to and view the same image as personnel in the cabin.

Figure 6B:
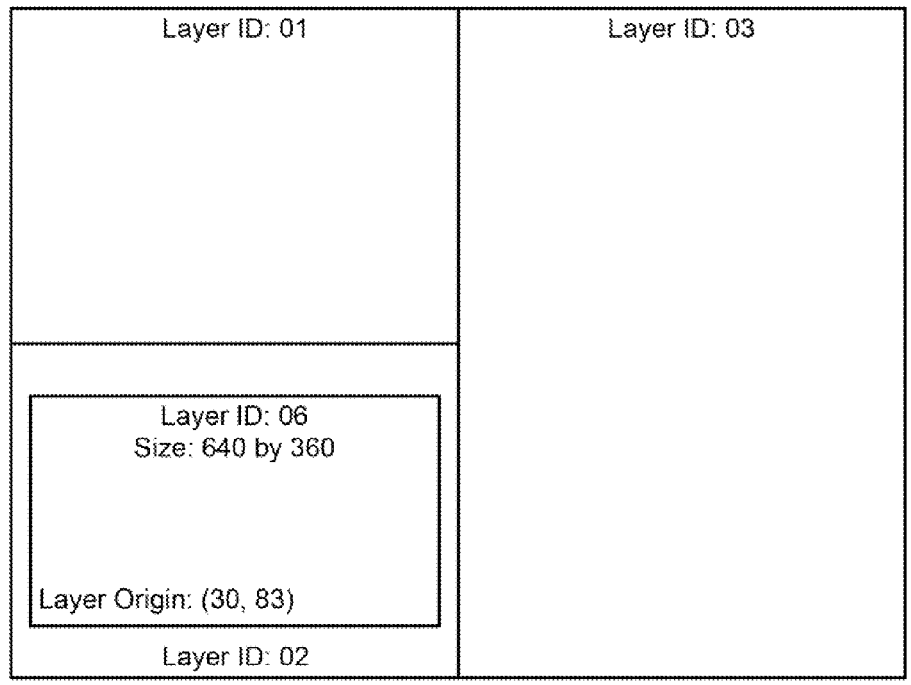
FIG. 6B depicts the exemplary display surface format of FIG. 2D with assigned layers.

Referring to FIG. 6B, layer 06 overlays with layer 02 in window 2 in the display surface format of FIG. 2D. Layer 06 originates at window pixel location (30, 83) which means it is approximately centered on window 2; in this example, a scaling factor of 0.5 has been applied as the size of layer 06 of 640 by 360 pixels indicates.

Figure 6C:
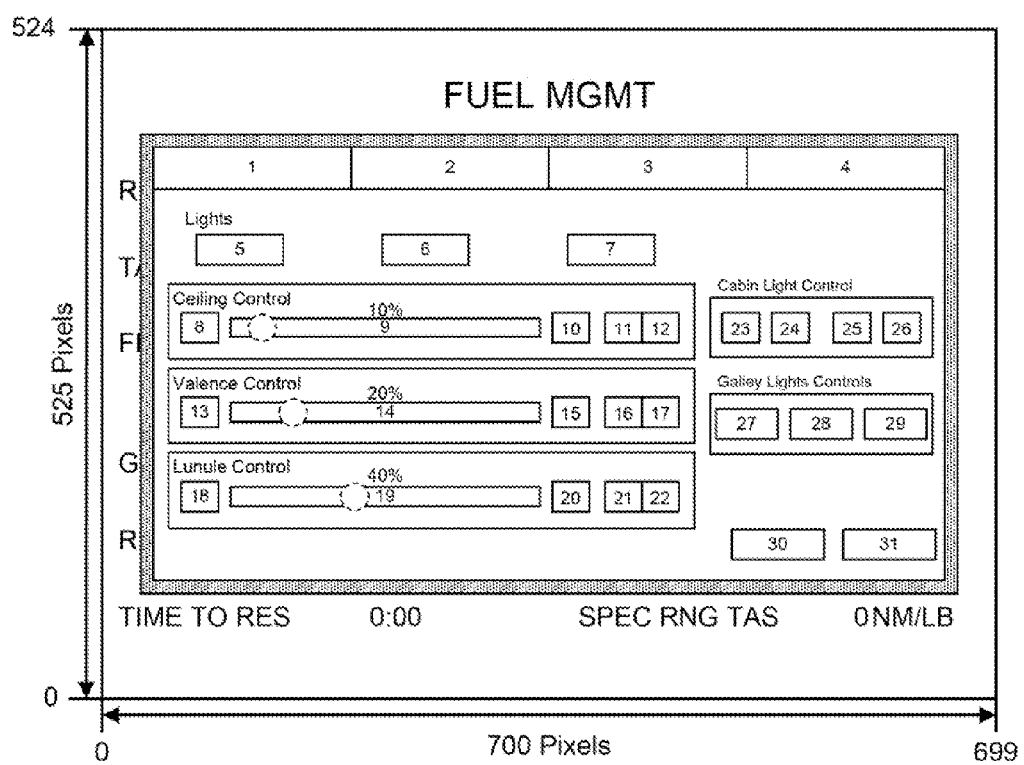
FIG. 6C depicts a map of the interactive widgets of the exemplary display surface format of FIG. 3B against part of the local image of FIG. 2A.

Referring to FIG. 6C, the map of the 31 interactive widgets shown in FIG. 3B is shown in place of its respective image shown of FIG. 4A as depicted over the "FUEL MGMT" panel of the lower left half of the control panel shown of FIG. 6A. Because the image occupies the area of layer 06 and because layer 06 originates at window pixel location (30, 83), the origin of each of the widgets is different than listed in the map table of FIG. 3B. Referring to the map table of FIG. 6D, the X(ref) and Y(ref) locations of FIG. 6C are found by adding 30 and 83 to one-half the X(ref) and Y(ref) locations of FIG. 3B, respectively, where the one-half corresponds to the scaling factor; additionally, the X(size) and Y(size) of each widget has been reduced by one-half because a scaling factor of 0.5 has been applied.

For the example illustrated by the drawings of FIG. 7, it will be assumed that personnel in the cockpit want to turn on the lights to the full cabin and move the lunule control to 80% as in the drawings of FIG. 5; however, the exemplary display surface format shown in FIG. 2D that has been employed in the drawings of FIG. 6 will be used.

Figures 6D, 7A:
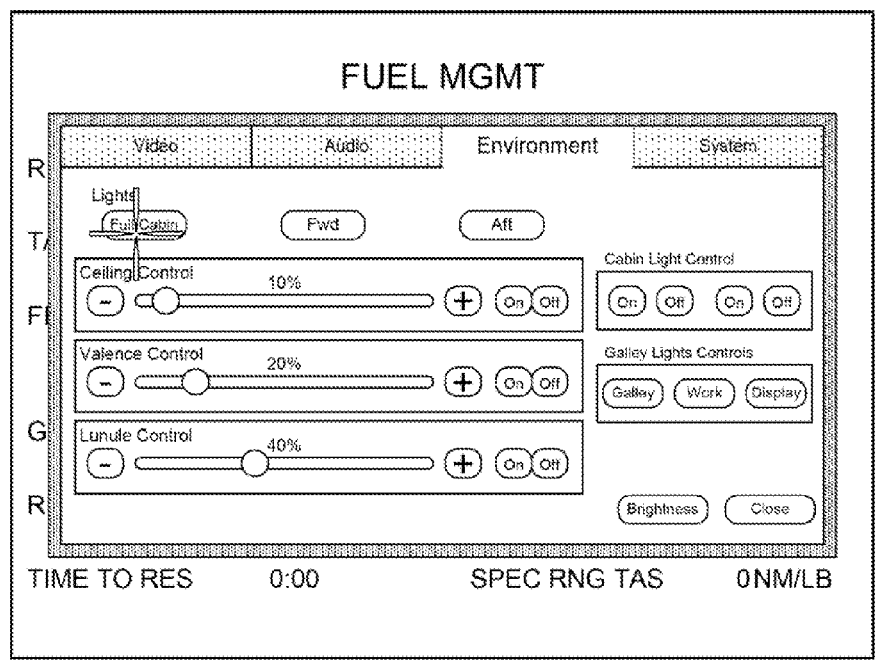
FIG. 6D depicts a map table corresponding to the map of the interactive widgets of FIG. 6C.
FIG. 7A depicts the local image of FIG. 6A to which a cursor has been added.

As shown in FIG. 7A, a cursor has been added to image of FIG. 6A, where the cursor is located over the "Full Cabin" push button of the VNC image widget. Moreover, the VNC image widget has been manually selected by the pilot pressing and releasing the cursor's button. When the cursor's button is pressed, the PM 170 may be programmed to capture the surface coordinates of the cursor's location (103, 361) and convert them into layer coordinates (146, 556), where the X(layer)=(103−30)/0.5 and Y(layer)=(361−83)/0.5 (where 0.5 is the scaling factor). Because an interaction with a VNC image widget has occurred, the PM 170 may notify the WMUA 160 of the event and provide the current state of the cursor's button (e.g., the cursor's button has been pressed) and the layer coordinates of the cursor's event in the notification. In response, the WMUA 160 could forward data representative of the notification the VNC client 0001 which, in turn, could generate and send two client-to-server messages in VNC protocol to the VNC server 0001 of the remote aircraft system 120-2.

Figure 7B:
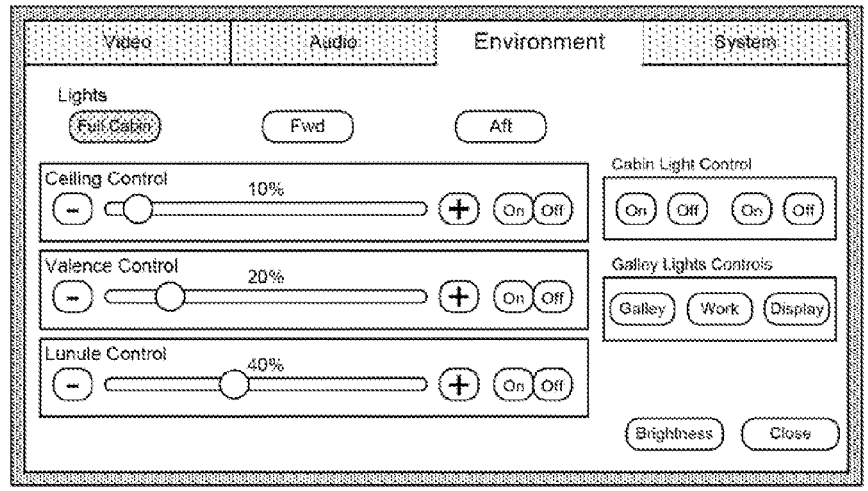
FIG. 7B depicts a change to a remote image in response to a selection.

Following the same discussion as presented above for the first message, the VNC client 0001 may generate and send data representative of a client-to-server message to the VNC server 001 notifying it of the current state of the cursor's button and the event location of the cursor. As this message is received by the VNC server 0001, the remote aircraft system 120-2 may respond as if personnel had pressed the surface at given location (146, 556) of the remote display unit 122; that is, the remote aircraft system 120-2 may respond as if personnel had manually selected the "Full Cabin" interactive widget on the remote display unit 122. This response is indicated in FIG. 7B by the change of appearance of "Full Cabin" interactive widget (as well as the lights in the full cabin being turned on). If the remote image's cursor is present, it could have been located on top of the interactive widget; unlike in FIG. 5B, however, the configuration of the remote display unit 122 of FIG. 7B does not include a cursor.

Following the same discussion as presented above for the second message, the VNC client 0001 may generate and send a client-to-server request comprised of data representative of a request for updated RFB information, either the entire RFB or a limited-area RFB. As shown in the map table of FIG. 3B, layer coordinates (146, 556) fall within the area of position 5 which corresponds to a "Full Cabin" pushbutton switch. After referring to the table, the request for a limited area of the RFB may correspond to X(ref)=90, Y(ref)=546, X(size)=140, and Y(size)=50.

Figure 7C:
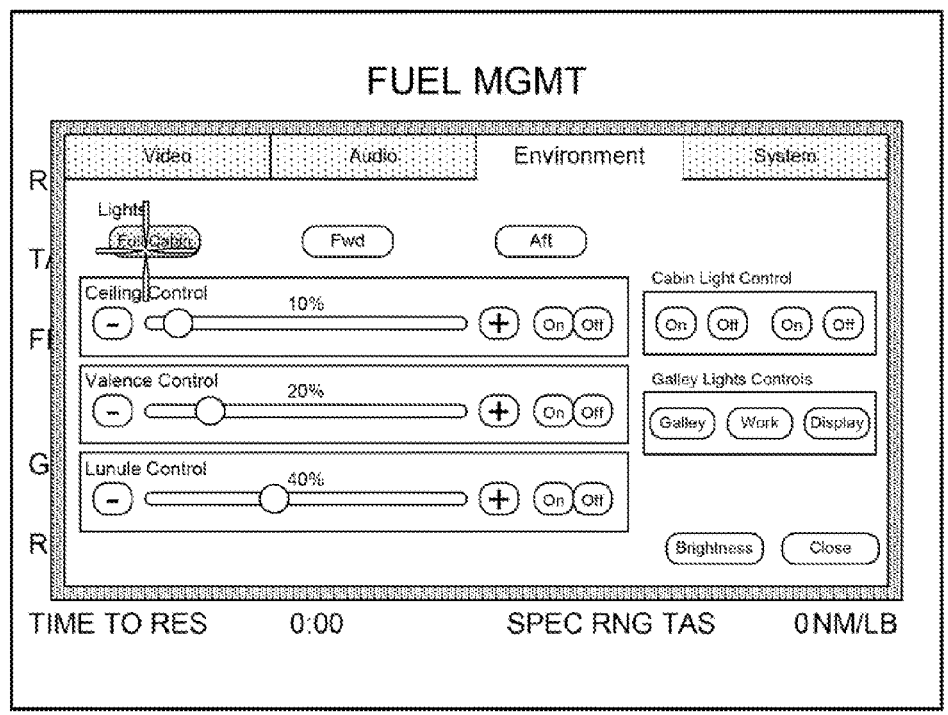
FIG. 7C depicts a change to the local image of FIG. 7A in response to the change to the remote image of FIG. 7B.

In response to receiving the second message, the VNC server 0001 may generate and send data representative of a server-to-client message in VNC protocol to the VNC client 0001 providing it with the updated RFB data of either the entire RFB or the limited-area RFB. In response, the VNC client 0001 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 7C is represented in the newly-incorporated pixel data set.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for incorporating Virtual Network Computing ("VNC") into a cockpit display system, such system comprising:
   a VNC server of an aircraft-installed system;
   at least one first user application;
   a second user application;
   a pilot input device; and
   a cockpit display system comprised of
   a processing module configured to
      establish a pixel data set representative of a first image, where
         such first image is comprised of at least one non-VNC widget, and
         each non-VNC widget is based upon corresponding non-VNC widget data from at least one first user application,
      receive first input data from the pilot input device, where
         such first input data corresponds to a request to display a second image,
      generate first data in response to the first input data, where
         such first data is representative of the request to display a second image,
      send the first data to the second user application, such that
         a VNC client of the second user application is configured to
            generate second data, where
               such second data is comprised of a request for remote frame buffer data of the second image,
            send the second data to the VNC server,
            receive third data from the VNC server, where
               such third data is responsive to the request for remote frame buffer data and is comprised of remote frame buffer data of the second image, and
            send fourth data responsive to the first data, where
               such fourth data is comprised of first VNC image widget data generated from the third data,
      receive the fourth data, and
      incorporate the fourth data into the pixel data set, whereby
         an image comprised of at least the VNC image widget is represented in the pixel data set.

2. The system of claim 1, wherein
   the first data and the fourth data comport to a protocol established by an aviation-industry standard, and
   the second data and the third data comport to a protocol established for a VNC system.

3. The system of claim 1, wherein
   the processing module is further configured to
      activate a layer to which the VNC image widget is assigned, such that
         the request to display a second image represented in the first data is comprised of a notice of layer activation, and
         the first VNC image widget data is representative of VNC image widget parameters and a request to activate the visibility of the layer.

4. The system of claim 1, wherein
   the processing module is further configured to
      provide the pixel data set to a display unit, and
   the cockpit display system is further comprised of
      at least one display unit configured to
         present the image represented in the pixel data set.

5. The system of claim 1, wherein the cockpit display system incorporates at least one of the following: the VNC server at least one first user application, the second user application, and the pilot input device.

6. The system of claim 1, wherein
   the processing module is further configured to
      receive second input data from the pilot input device, where
         such second input data corresponds to a VNC image widget and includes location information of the event,
      generate fifth data in response to the second input data, where such fifth data is representative of both the location information and a state of the VNC image widget event,
send the fifth data to the second user application, such that
the VNC client is further configured to
generate sixth data, where
such sixth data is comprised of
a notification of the location information and the state, and
a request for updated remote frame buffer data of the second image,
send the sixth data to the VNC server,
receive seventh data from the VNC server, where
such seventh data is responsive to the request for updated remote frame buffer data and is comprised of updated remote frame buffer data of the second image, and
send eighth data responsive to the fifth data, where
such eighth data is updated VNC image widget data generated from the seventh data,
receive the eighth data, and
incorporate the eighth data into the pixel data set, whereby
an image comprised of at least an updated VNC image widget is represented in the pixel data set.

7. The system of claim 6, wherein
the fifth data and the eighth data comport to a protocol established by an aviation-industry standard, and
the sixth data and the seventh data comport to a protocol established for a VNC system.

8. The system of claim 6, wherein
the location information of the second input data corresponds to the location coordinates of the display unit surface, and
the location information of the sixth data corresponds to the location coordinates of the VNC image.

9. A system for controlling an aircraft system with a cockpit display system incorporating Virtual Network Computing ("VNC"), such system comprising:
a VNC server of an aircraft-installed system;
a user application;
a pilot input device;
a display surface format comprised of
at least one layer to which at least one non-VNC widget is assigned, and
at least one layer to which at least one VNC image widget is assigned; and
a cockpit display system comprised of
the processing module configured to
establish a pixel data set representative of a first image, where
such first image is comprised of at least one VNC image widget,
receive first input data from the pilot input device, where
such first input data corresponds to a VNC image widget event and includes location information of the event,
generate first data in response to the first input data, where
such first data is representative of both the location information and a state of the VNC image widget event,
send the first data to the user application, such that
a VNC client of the user application is configured to generate second data, where
such second data is comprised of
a notification of the location information and the state, and
a request for updated remote frame buffer data of the VNC image corresponding to the VNC image widget,
send the second data to the VNC server,
receive third data from the VNC server, where
such third data is responsive to the request for updated remote frame buffer data and is comprised of updated remote frame buffer data of the VNC image corresponding to the VNC image widget, and
send fourth data responsive to the first data, where
such fourth data is comprised of updated VNC image widget data generated from the third data,
receive the fourth data, and
incorporate the fourth data into the pixel data set, whereby
an image comprised of at least an updated VNC image widget is represented in the pixel data set.

10. The system of claim 9, wherein
the non-VNC widget and the VNC image widget are assigned to the same layer,
the first data and the fourth data comport to a protocol established by an aviation-industry standard, and
the second data and the third data comport to a protocol established for a VNC system.

11. The system of claim 9, wherein
the location information of the first input data corresponds to the location coordinates of the display unit surface, and
the location information of the second data corresponds to the location coordinates of the VNC image.

12. The system of claim 9, wherein
the processing module is further configured to
provide the pixel data set to a display unit, and
the cockpit display system is further comprised of
at least one display unit configured to
present the image represented in the pixel data set.

13. The system of claim 9, wherein the cockpit display system incorporates at least one of the following: the VNC server, the user application, the pilot input device, and the display surface format.

14. A method for incorporating Virtual Network Computing ("VNC") into a cockpit display system, such method comprising:
establishing a pixel data set representative of a first image, where
such first image is comprised of at least one non-VNC widget, and
each non-VNC widget is based upon corresponding non-VNC widget data from at least one first user application;
receiving first input data from a pilot input device, where
such first input data corresponds to a request to display a second image;
generating first data in response to the first input data, where
such first data is representative of the request to display a second image;
sending the first data to a second user application, such that
a VNC client of a second user application is configured to
generate second data, where
such second data is comprised of a request for remote frame buffer data of the second image, send the second data to a VNC server of an aircraft-installed system,
receive third data from the VNC server, where
such third data is responsive to the request for remote frame buffer data and is comprised of remote frame buffer data of the second image, and
send fourth data responsive to the first data, where
such fourth data is comprised of first VNC image widget data generated from the third data;
receiving the fourth data; and
incorporating the fourth data into the pixel data set, whereby
an image comprised of at least the VNC image widget is represented in the pixel data set.

15. The method of claim 14, wherein
the first data and the fourth data comport to a protocol established by an aviation-industry standard, and
the second data and the third data comport to a protocol established for a VNC system.

16. The method of claim 14, further comprising:
activating a layer to which the VNC image widget is assigned, such that
the request to display a second image represented in the first data is comprised of a notice of layer activation, and
the first VNC image widget data is representative of VNC image widget parameters and a request to activate the visibility of the layer.

17. The method of claim 14, further comprising:
providing the pixel data set to a display unit, whereby
the image represented in the pixel data set is presented.

18. The method of claim 14, further comprising:
receiving second input data from the pilot input device, where
such second input data corresponds to a VNC image widget event and includes location information of the event;
generating fifth data in response to the second input data, where
such fifth data is representative of both the location information and a state of the VNC image widget event;
sending the fifth data to the second user application, such that
the VNC client is further configured to
generate sixth data, where
such sixth data is comprised of
a notification of the location information and the state, and
a request updated remote frame buffer data of the second image,
send the sixth data to the VNC server,
receive seventh data from the VNC server, where
such seventh data is responsive to the request for updated remote frame buffer data and is comprised of updated remote frame buffer data of the second image, and
send eighth data responsive to the fifth data, where
such eighth data is updated VNC image widget data generated from the seventh data;
receiving the eighth data; and
incorporating the eighth data into the pixel data set, whereby
an image comprised of at least an updated VNC image widget is represented in the pixel data set.

19. The method of claim 18, wherein
the fifth data and the eighth data comport to a protocol established by an aviation-industry standard, and
the sixth data and the seventh data comport to a protocol established for a VNC system.

20. The method of claim 18, wherein
the location information of the second input data corresponds to the location coordinates of the display unit surface, and
the location information of the sixth data corresponds to the location coordinates of the VNC image.

21. A method for controlling an aircraft system with a cockpit display system incorporating Virtual Network Computing ("VNC"), such comprising:
establishing a pixel data set representative of a first image, where
such first image is comprised of at least one VNC image widget and based upon a display surface format comprised of
at least one layer to which at least one non-VNC widget is assigned, and
at least one layer to which at least one VNC image widget is assigned;
receiving first input data from a pilot input device, where
such first input data corresponds to a VNC image widget event and includes location information of the event;
generating first data in response to the first input data, where
such first data is representative of both the location information and a state of the VNC image widget event;
sending the first data to a user application, such that
a VNC client of the user application is configured to
generate second data, where
such second data is comprised of
a notification of the location information and the state, and
a request for updated remote frame buffer data of the VNC image corresponding to the VNC image widget,
send the second data to a VNC server of an aircraft-installed system,
receive third data from the VNC server, where
such third data is responsive to the request for updated remote frame buffer data and is comprised of updated remote frame buffer data of the VNC image corresponding to the VNC image widget, and
send fourth data responsive to the first data, where
such fourth data is comprised of updated VNC image widget data generated from the third data;
receiving the fourth data; and
incorporating the fourth data into the pixel data set, whereby
an image comprised of at least an updated VNC image widget is represented in the pixel data set.

22. The method of claim 21, wherein
the non-VNC widget and the VNC image widget are assigned to the same layer,
the first data and the fourth data comport to a protocol established by an aviation-industry standard, and
the second data and the third data comport to a protocol established for a VNC system.

23. The method of claim 21, wherein
the location information of the first input data corresponds to the location coordinates of the display unit surface, and
the location information of the second data corresponds to the location coordinates of the VNC image.

24. The method of claim 21, further comprising:
providing the pixel data set to a display unit, whereby the image represented in the pixel data set is presented.

* * * * *